United States Patent [19]
Rode

[11] Patent Number: 5,407,123
[45] Date of Patent: Apr. 18, 1995

[54] BRUSH AUGER MACHINE

[75] Inventor: Chris Rode, Delphos, Ohio

[73] Assignee: Gasdorf Tool & Machine Co., Inc., Lima, Ohio

[21] Appl. No.: 199,566

[22] Filed: Feb. 22, 1994

[51] Int. Cl.6 ................ B23K 31/02; B23K 37/047
[52] U.S. Cl. .................................. 228/212; 228/9;
    228/44.3; 29/23.51; 29/456; 29/787; 29/889;
    300/1; 300/21
[58] Field of Search ............... 228/164, 173.2, 175,
    228/212, 9, 4.1, 44.3; 29/23.51, 456, 787, 820,
    889; 300/1, 21; 219/159, 137 R

[56] References Cited
U.S. PATENT DOCUMENTS

| | | | |
|---|---|---|---|
| 2,442,446 | 6/1948 | Wallace | 29/456 |
| 3,720,241 | 3/1973 | Bryant et al. | 141/25 |
| 4,140,264 | 2/1979 | Yago | 29/456 |
| 4,208,004 | 6/1980 | Yago | 29/456 |

FOREIGN PATENT DOCUMENTS 132769  11/1978  Germany .................. 29/456

Primary Examiner—Samuel M. Heinrich
Attorney, Agent, or Firm—Emch, Schaffer, Schaub & Porcello Co.

[57] ABSTRACT

A brush auger machine for assembling a brush to an auger is disclosed. The machine includes a frame for supporting an auger having a shaft and a spiral blade. A welding station is adjacent the frame. A guide chute receives the continuous brush and defines a diameter approximately equal to the outer diameter of the completed brush auger assembly. A discharge frame is positioned adjacent the welding station and includes a motor driven chuck which holds and rotates the end of the auger shaft. The motor and chuck are mounted on a movable platform. Welding is completed at the welding station and rotation of the auger shaft moves the assembly and the platform along the discharge frame.

15 Claims, 5 Drawing Sheets

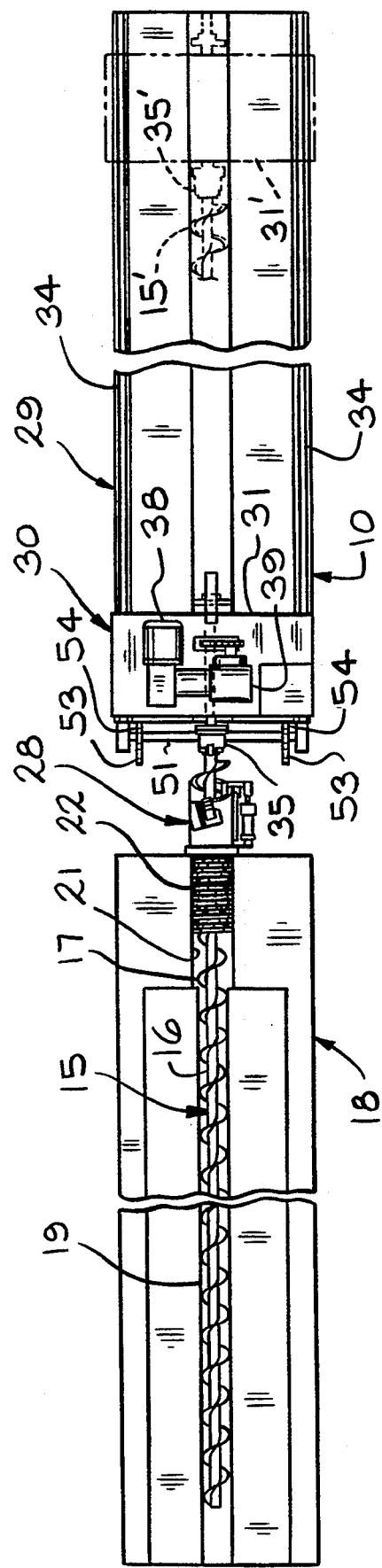
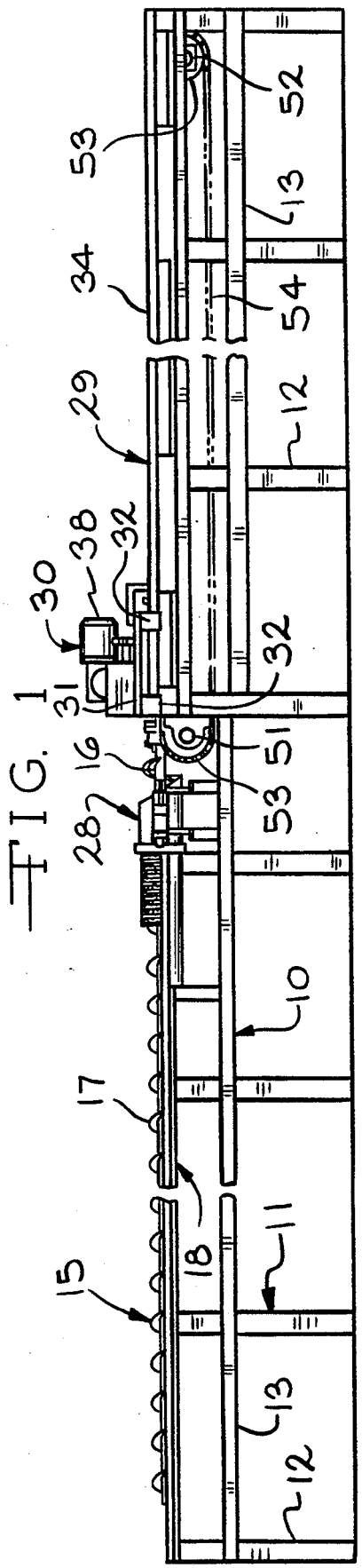
FIG. 1
FIG. 2

BRUSH AUGER MACHINE

BACKGROUND OF THE INVENTION

The present invention is directed to a method and machine for assembling brush augers. Brush augers are known in the art and include an auger having a central shaft and a continuous spiral blade. The brush is also known in the art and includes a continuous holder which holds a plurality of bristles forming the brush. Normally the auger and holder are metal and the bristles plastic. The brush must be attached to the blade of the auger. The present method and machine attaches or assembles the auger and the brush.

Brush augers are used in conveyor systems. Normally a brush conveyor is utilized to carry articles which can be relatively easily damaged. One use of a brush auger conveyor is in the field of farm implements for the transporting of grains.

Other uses of brush augers, for examples, are the transporting of foods and pharmaceutical pills or tablets.

The primary object of the present invention is to provide a method and machine for assembling the brush and auger components to form an assembled brush auger having the brush attached to the spiral blade of the auger.

SUMMARY OF THE INVENTION

The brush auger machine of the present invention is utilized to assemble an auger having a central shaft and a continuous spiral blade attached to the shaft. The blade has an outer end. The brush includes a continuous holder which holds a plurality of bristles forming the brush.

The brush auger machine includes a horizontal loading frame having a support portion for holding and guiding an auger. The loading machine also includes a receiving means for receiving a coiled continuous brush positioned in surrounding relationship to the auger.

A welding station is provided adjacent the loading frame. A discharge frame is adjacent the welding station and is located in opposed relationship to the loading frame. A drive assembly is mounted for movement along the discharge frame. The drive assembly includes a holding frame for holding the forward end of the auger. A motor is operatively connected to the auger shaft for rotating the shaft.

Control means are provided for rotating the shaft through predetermined increments of rotation.

BRIEF DESCRIPTION OF THE DRAWINGS

FIG. 1 is a top plan view of a brush auger machine, according to the present invention;

FIG. 2 is an elevational view of the brush auger machine shown in FIG. 1;

DETAILED DESCRIPTION OF THE PREFERRED EMBODIMENT

Figure 3:
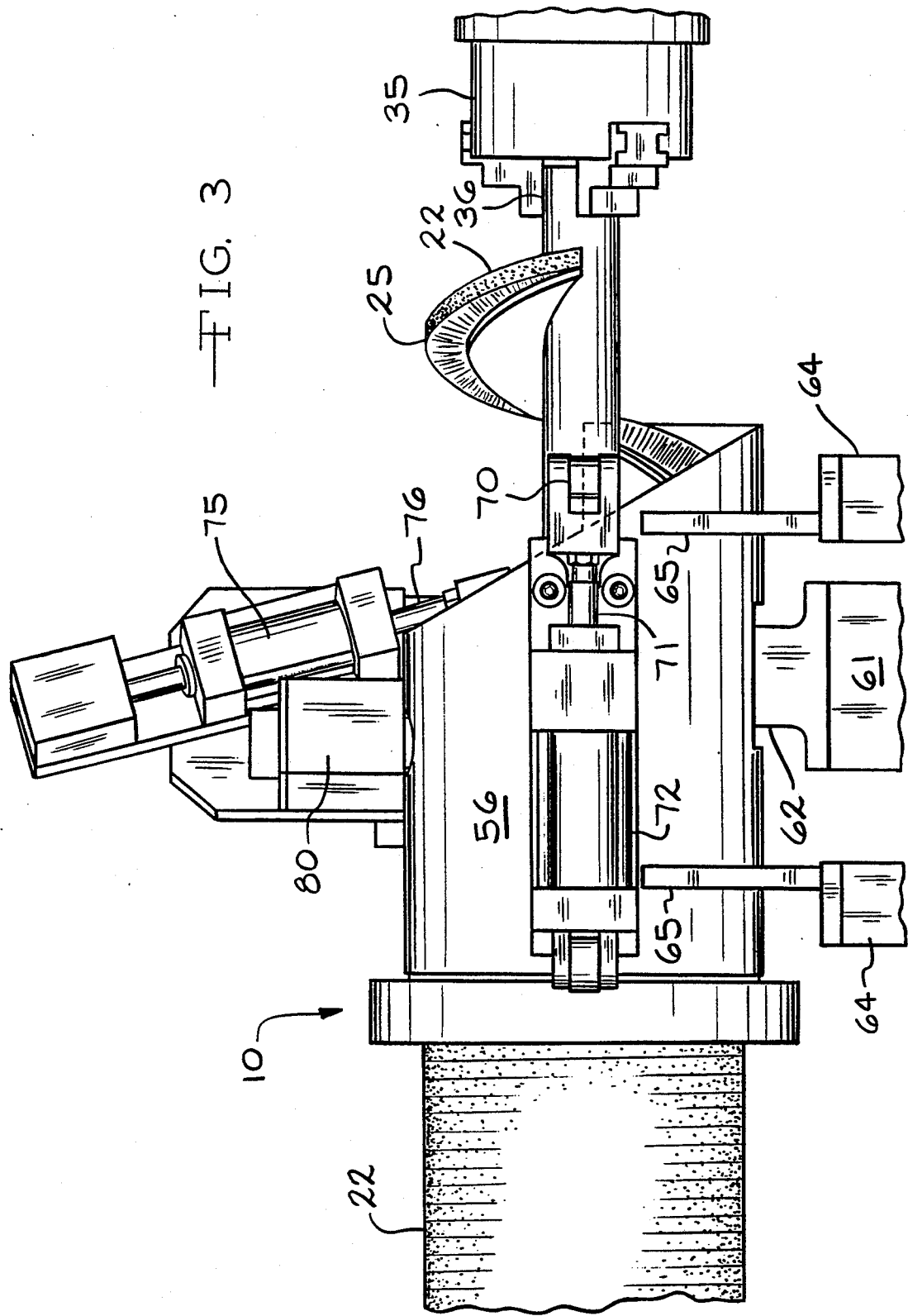
FIG. 3 is an enlarged elevational view, similar to FIG. 2, and particularly illustrating the welding station.

Referring to FIGS. 1 and 2, a brush auger machine, according to the present invention, is generally indicated by the reference number 10. The brush auger machine 10 is provided with a base 11 including a series of vertical supports 12 and horizontal frame members 13.

Referring to FIG. 1, an auger 15 has a central shaft 16 and a continuous spiral blade 17 attached to the shaft 16. In the present embodiment, the auger 15 is constructed of metal. The brush auger machine 10 includes a horizontal loading frame 18 having a center support portion 19 for holding and guiding the auger 15. In the present embodiment, the support portion 19 is a longitudinally extending passageway which receives and guides the auger 15 and has a generally semi-circular cross section. The diameter of the semicircular cross section is slightly larger than the outer diameter of the auger blade.

Figure 5:
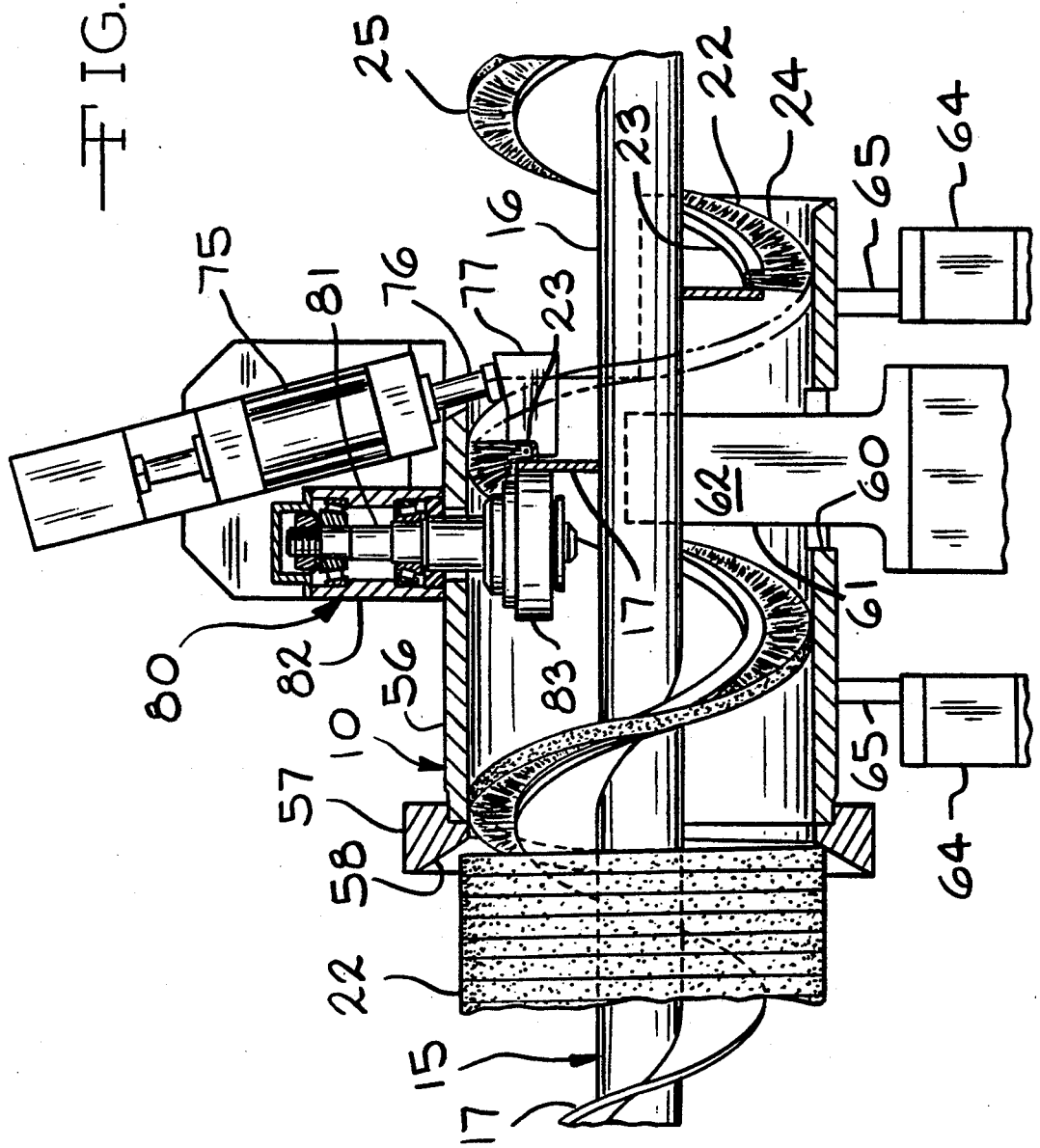
FIG. 5 is fragmentary sectional view taken along the line 5—5 of FIG. 4.

The horizontal loading frame 18 also includes a receiving means or channel 21 which receives a continuous coil of a brush 22. The brush 22 is positioned in surrounding relationship to the auger 15. Referring to FIG. 5, the brush 22 is known in the art and includes a metallic holder 23 having a generally U-shaped cross section. The holder 23 is normally constructed of metal and receives and holds a plurality of bristles 24. The bristles 24 have an outer end 25 which define the operating diameter of the assembled brush auger, after assembly is completed. The purpose of the brush auger machine 10 is to connect, in the present embodiment weld, the continuous holder 23 of the brush 22 to the spiral blade 17 of the auger 15.

Referring to FIGS. 1 and 2, a welding station 28 is positioned adjacent the horizontal loading frame 18. A discharge frame 29 is positioned adjacent the welding station 28 in an opposed relationship to the horizontal loading frame 18. A drive assembly 30 is mounted for movement along the discharge frame 29. The drive assembly 30 includes a platform 31 having bearing blocks 32 mounted on its lower side. The discharge frame 29 includes a pair of spaced guide rods 34 which mount the bearing blocks 32. The platform 31 travels along the guide rods 34. The front end of the drive assembly 30 includes holding means, and more specifically a rotatable chuck 35, which receives and holds a forward end 36 of the auger shaft 16.

Figure 6:
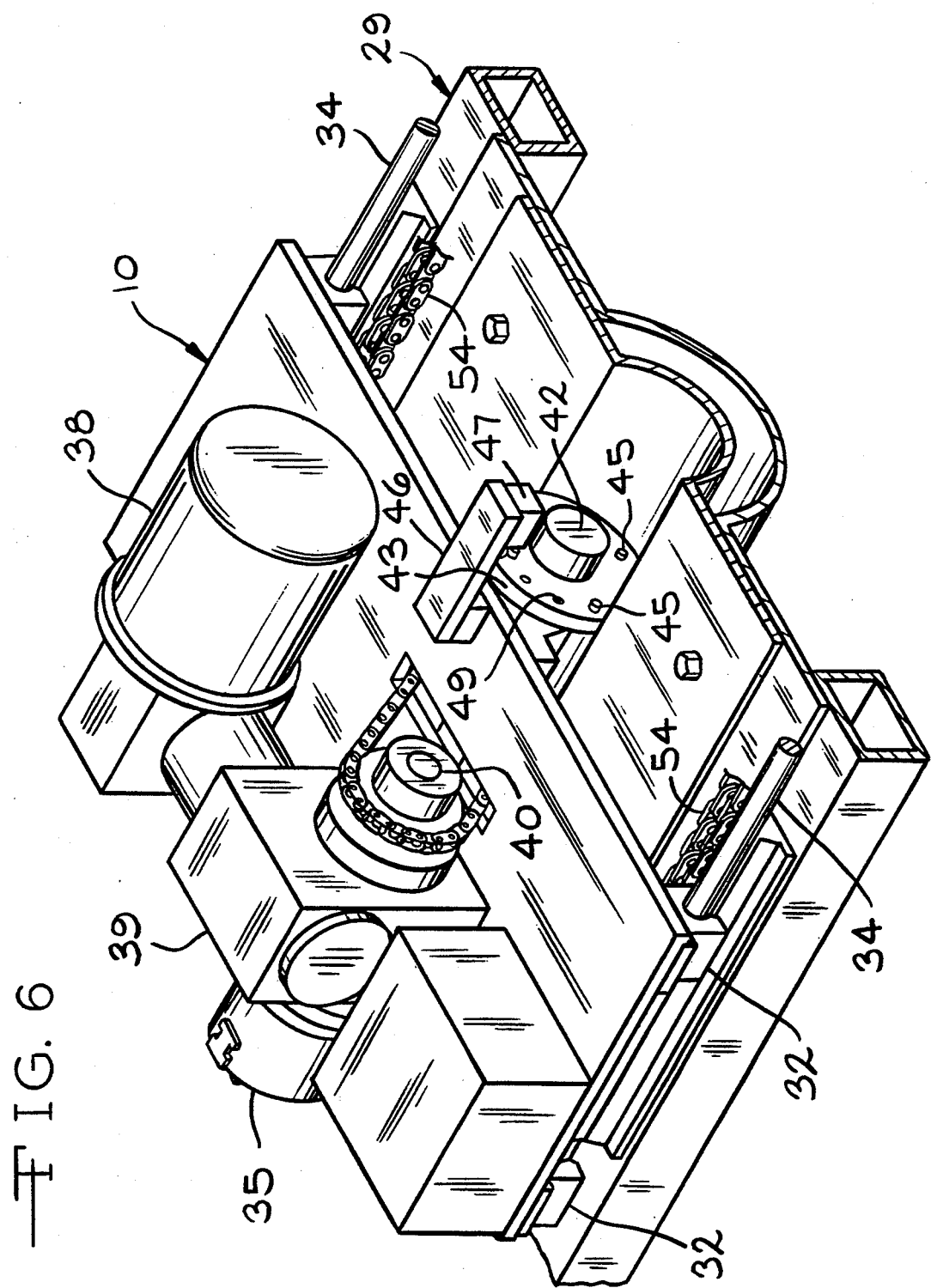
FIG. 6 is a fragmentary perspective view of the drive assembly.

Referring to FIG. 6, an motor 38 is operatively connected through a gear reducer 39 to an output shaft 40. The shaft 40 rotatably mounts the chuck 35. The motor 38 and the gear reducer 39 are mounted on the platform 31 of the drive assembly 30. A control shaft 42 is rotatably mounted below the platform 31 and is driven by a drive chain 43 mounted by the output shaft 40. The control shaft 42 mounts a control disk 43 having a plurality of actuators 45 which are angularly positioned at predetermined incremental positions, In the present embodiment, the actuators 45 are positioned at 90° increments around the control disk 43. A control arm 46 extends from the platform 31 and includes a switch 47 operatively connected to the circuit of the motor 38. The switch 47 is actuated to open the motor circuit each time it is engaged by one of the actuators 45. In the present embodiment, the switch is activated upon each 90° rotation to stop the motor 38. However, the actuators 45 may be repositioned in holes 49 to provide different increments of rotation. In the present embodiment, a weld is provided on the blade 17 of the auger 15 after each 90° increment of rotation.

Referring to FIG. 1, after welding of the brush 22 to the auger 15 is completed, the assembled brush and auger reaches the dash line position 15' shown in FIG. 1. Similarly, the platform has reached the far right position 31'. When in this position, the completed brush auger assembly is removed from the chuck 35 and from the discharge frame 29.

The discharge frame 29 includes shafts 51 and 52 at its opposed ends. The shafts 51 and 52 mount gears 53 at their outer ends. A pair of drive chains 54 are mounted by the gears 53 on opposite sides of the discharge frame 29. The platform 31 is operatively connected to the drive chains 54. The drive chains 54 are rotated to return the platform from its position 31' to its original left hand starting position 31 (as shown in FIG. 1).

Referring to FIG. 5, the welding station 28 includes a guide chute 56 having a predetermined diameter generally equal to the desired operating or outer diameter of the assembled brush auger. An entrance ring 57 having a sloped face 58 is provided at the entrance end of the guide chute 56. As the brush 22 is pulled from the coil, as shown in FIG. 5, the sloped face 58 urges the brush to the correct diameter as defined by the guide chute 56.

The guide chute 56 defines a bottom opening 60 which receives a welding support 61. The welding support 61 is preferably constructed of an electrically conductive metal and includes an upper end 62 which defines a saddle for receiving and supporting the central shaft 16 of the auger 15 during welding. The welding support 61 is in electrical relationship with the auger shaft 16. The bottom of the welding support 61 is electrically grounded and is supported by the base 11. Referring to FIGS. 3 and 5, a pair of additional support members 64 extend upwardly from the base 11. The support members 64 include upper arms 65 which engage and support the guide chute 56.

Figure 4:
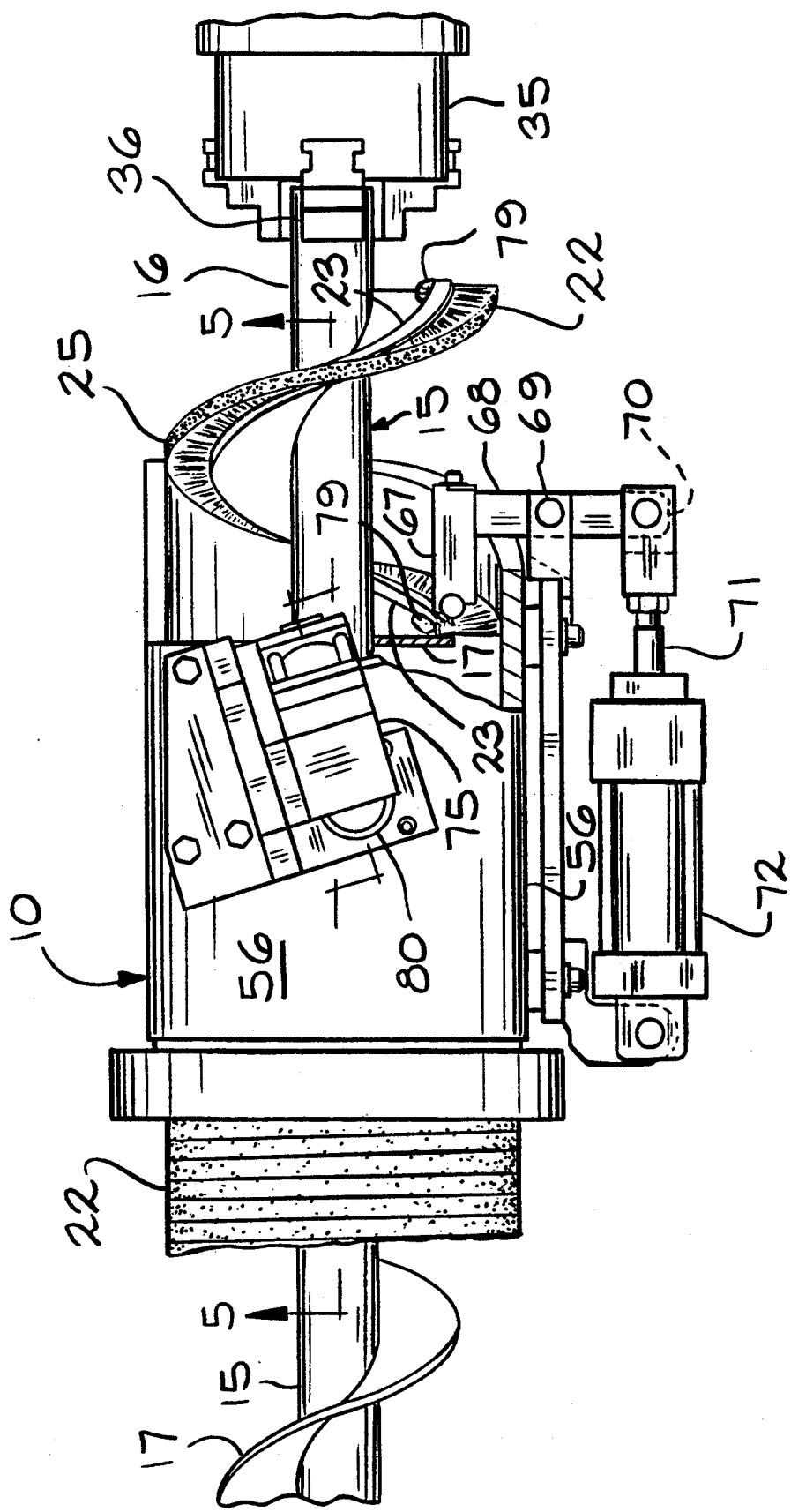
FIG. 4 is an enlarged plan view, similar to FIG. 1, and particularly illustrating the welding station.

Referring to FIG. 4, the welding station 28 also includes clamping means for securing the brush holder 23 tightly against the blade 17 of the auger 15 during welding. Referring to FIG. 4, a clamp arm 67 is connected to a rod 68 which is pivotally mounted by a pivot pin 69 adjacent the guide chute 56. An outer end 70 of the rod 68 is pivotally connected to the rod 71 of a cylinder 72. When the rod 71 of the cylinder 72 is extended, as shown in FIG. 4, the clamp arm 67 secures the brush holder 23 tightly against the blade 17 for welding. When the cylinder rod 71 is retracted, the clamp arm 67 is pivoted away from the brush holder 23.

Referring to FIG. 5, in the present embodiment, an additional clamping means is shown. A cylinder 75 having a rod 76 mounts a clamping shoe 77 at its lower end. When the cylinder rod 76 is retracted, the clamping shoe 77 is moved to its clamping position as shown in FIG. 5. The clamping shoe 77 secures the brush holder 23 into its welding position against the blade 17 of the auger 15. When the welding is completed, the rod 76 is extended moving the clamping shoe 77 outwardly away from the holder 23. It has been found that in some operations of the brush auger machine 10, that the second cylinder 75 and its clamping shoe 77 are not required to properly secure the brush holder 23 against the auger blade 17 during welding.

Referring to FIG. 4, a weld 79 is indicated. After the weld 79 is completed the clamping cylinders 72 and 75 are actuated to retract the clamping means. At this time, the central shaft 16 is rotated 90° for the next welding step. When the 90° rotation is completed, the cylinders 72 and 75 are again actuated for the next welding cycle. In the brush auger machine 10, the welding may be performed manually or in the alternative automatically with a known prior art automatic welder.

Referring to FIG. 5, a roller assembly 80 is mounted above the guide chute 56. The roller assembly 80 includes a shaft 81 which is journaled by a housing 82. The lower end of the shaft 81 mounts a roller 83. The roller 83 has an elastomeric outer surface and engages the blade 17. The roller 73 places a force on the auger 15 along its longitudinal centerline when the auger 15 is rotated by the chuck 35. After each welding cycle is completed, as mentioned above, the chuck 35 is rotated through the desired increment of rotation. The roller 83 ensures that the force of the rotating blade 17 moves the assembled brush auger together with the platform 30 to the right, as shown in FIG. 1, until the brush auger assembly is completed and the platform has reached the position indicated by the dashed reference number 31'.

In a typical operation using the brush auger machine 10, according to the present invention, the auger 15 is placed on a longitudinal path defined by the semi-circular support portion 19 of the horizontal loading frame 18. The auger 15 is then surrounded with the coil of brush 22 positioned within the channel 21 of the loading frame 18. The forward end 36 of the auger 15 is secured within the chuck 35 and the end of the coil is pulled through the entrance ring 57 and the guide chute 56 to shape and set the desired outer diameter of the completed assembly. An initial weld is made between the brush holder 23 and the blade 17 of the auger 15 at the welding station 28.

At this time the operator actuates a switch, preferably a foot switch. The motor 38 is actuated and the auger 15 acting through the chuck 35 is rotated to its preset angular increment rotation, in this case 90°. Because of the force generated by the roller 83, the auger 15 together with the platform 31 is moved to the right as shown in FIG. 1. After the control disk 43 has rotated 90°, an actuator 45 actuates the switch 47 to open the circuit to the drive motor 38. The auger 15 and the brush 22 is now in position in the welding station for the next successive weld. After the weld is completed, operation of the foot switch closes the circuit to the motor 38, the chuck 35 and the auger 15 are rotated to again move the auger 15 and the platform 31 to the right, as shown in FIG. 1. The described operation is continued until the brush 22 is welded along the entire length of the auger 15. After the assembly is completed, the assembly is removed and the drive chains 54 return the platform 31 to its starting position as shown in FIG. 1.

Many modifications may be made to the best mode of the invention described above without departing from the scope of the invention or from the following claims.

I claim:

1. A brush auger machine for assembling a brush to an auger having a central shaft and a continuous spiral blade attached to said shaft, the blade having an outer edge, the brush including a continuous holder which holds a plurality of bristles forming the brush, the assembled brush auger having an outer diameter, comprising, a horizontal loading frame having a support portion for holding and guiding an auger having a forward end on its shaft, said loading frame includes receiving means for receiving a coiled continuous brush positioned in surrounding relationship to the auger, a welding station adjacent said loading frame, a discharge frame adjacent said welding station in opposed relationship to said loading frame, said drive assembly including holding means for holding such forward end of the auger shaft, motor means operatively connected to said auger shaft for rotating said shaft, and control means for rotating said shaft through predetermined increments of rotation.

2. A brush auger machine, according to claim 1, wherein said welding station includes a guide chute having a predetermined diameter generally equal to such outer diameter of the assembled brush auger.

3. A brush auger machine, according to claim 1, wherein said loading frame defines a longitudinally extending passageway for receiving and guiding such auger.

4. A brush auger machine, according to claim 3, wherein such passageway has a generally semi-circular cross section.

5. A brush auger machine, according to claim 1, wherein said welding station includes clamping means for securing said brush holder against said auger blade during welding.

6. A brush auger machine, according to claim 5, including cylinder means operatively connected to said clamping means for moving said clamping means between an inoperative position and an operative position.

7. A brush auger machine, according to claim 2, including support means for supporting said guide chute.

8. A brush auger machine, according to claim 1, wherein said welding station includes a roller assembly having a roller adjacent the blade of the auger, whereby rotation of the auger shaft urges said auger toward said discharge frame.

9. A brush auger machine, according to claim 2, wherein said guide chute defines a bottom opening and a welding support extending upwardly through said bottom opening, said welding support having an upper end in supporting and electrical relationship with such auger shaft.

10. A brush auger machine, according to claim 1, wherein said holding means comprises a driven chuck releasably attached to such forward end of the auger shaft, said drive assembly including a movable platform, said motor means and said chuck being mounted by said movable platform, said motor means being operatively connected to said chuck for rotating the auger shaft.

11. A brush auger machine, according to claim 1, wherein said control means includes a rotatable disk driven by said motor means, a plurality of spaced actuators mounted on said disk and a switch member electrically connected to said motor means, whereby rotation of said disk sequentially moves said spaced actuators adjacent said switch member to operate said switch member, whereby rotation of such auger shaft is stopped.

12. A brush auger machine, according to claim 10, said drive assembly including a pair of longitudinally extending guide members, said platform including bearing members mounted for movement on said guide members, whereby rotation of such auger moves said platform along said guide members.

13. A brush auger machine, according to claim 10, wherein said drive assembly includes a chain drive connected to said movable platform, whereby said chain drive can be operated to move said platform toward said welding station.

14. A brush auger machine for assembling a brush to an auger having a central shaft and a continuous spiral metal blade attached to the shaft, the blade having an outer edge, the brush including a metal holder which holds a plurality of bristles forming the brush, the assembled brush auger having an outer diameter, a horizontal loading frame having a longitudinally extending support portion for guiding an auger having a forward end on its shaft, said loading frame including a receiving portion for receiving a coiled continuous brush positioned in surrounding relationship to such auger, a welding station adjacent said loading frame, a guide chute having a predetermined diameter equal to such outer diameter of such assembled brush auger, said welding station including clamping means for securing said brush holder against said auger blade during welding, a roller assembly having a roller adjacent such blade of the auger, a discharge frame adjacent said welding station in opposed relation to said loading frame, said discharge frame including a platform movable along said discharge frame, holding means mounted for rotation by said platform, said holding means receiving such forward end of such auger shaft, and motor means on said platform operatively connected to said holding means.

15. A method of assembling a brush having a holder to an auger comprising the steps of:

(1) placing the auger for movement along a longitudinal path;

(2) surrounding the auger with a brush coil;

(3) shaping the coil to a predetermined diameter;

(4) welding the holder to the auger at a point location;

(5) rotating the auger a predetermined angular increment;

(6) moving the auger along such longitudinal path; and (7) successively repeating the welding step until brush auger assembly is completed.

* * * * *